Dec. 2, 1958 P. REHM 2,862,792
PROCESS AND APPARATUS FOR THE PRODUCTION
OF FINELY DIVIDED POWDERS
Filed May 16, 1955 2 Sheets-Sheet 1
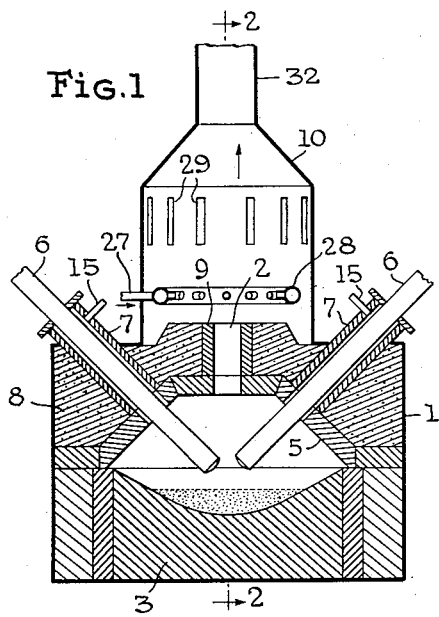
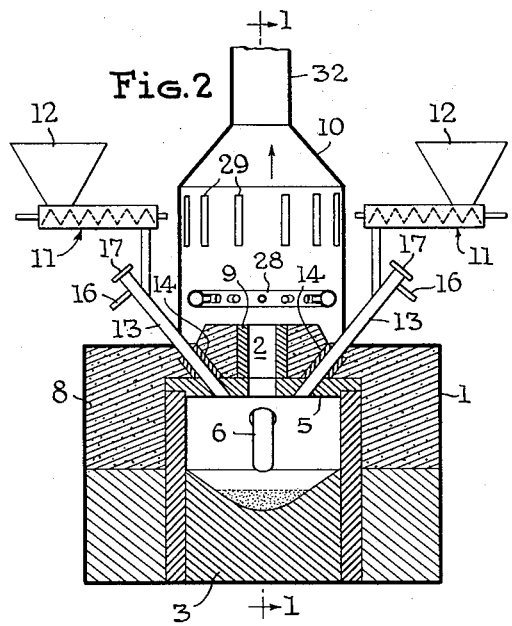
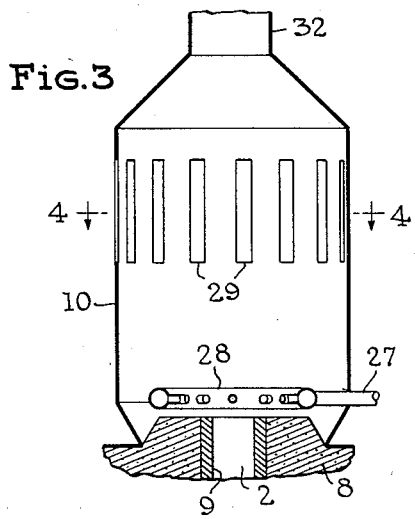
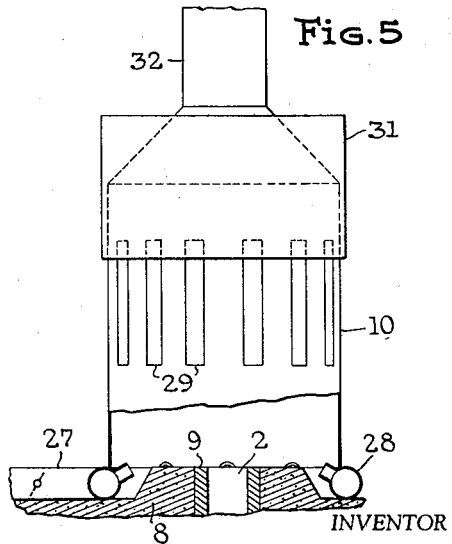
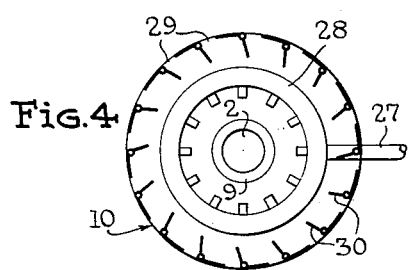
INVENTOR
Paul Rehm
BY
ATTORNEY

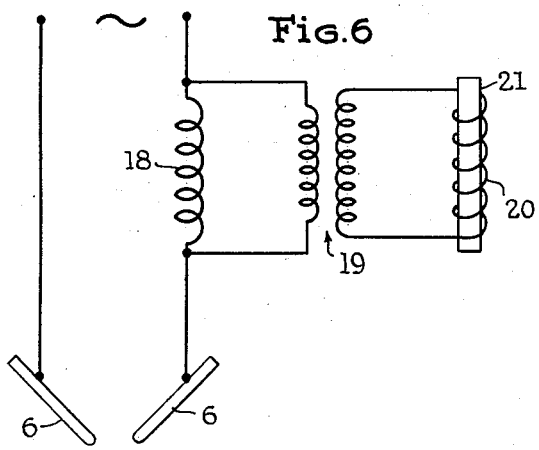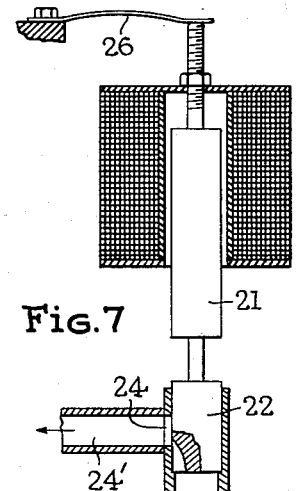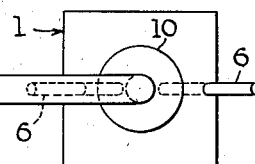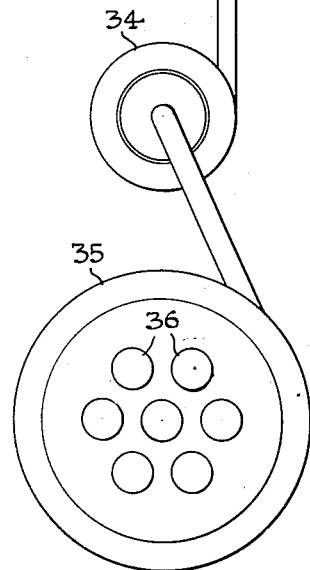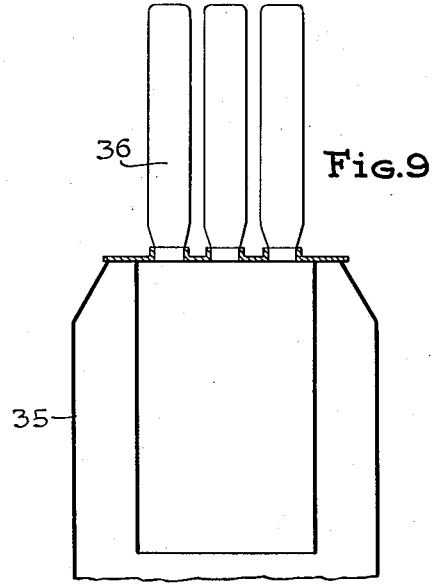

United States Patent Office 2,862,792
Patented Dec. 2, 1958

2,862,792

PROCESS AND APPARATUS FOR THE PRODUCTION OF FINELY DIVIDED POWDERS

Paul Rehm, Grenoble, France, assignor to "Solumeta," Paris, France, a corporation of France Application May 16, 1955, Serial No. 508,757

Claims priority, application France May 28, 1954

12 Claims. (Cl. 23—182)

It has already been proposed to vaporize refractory minerals in an electric arc furnace and to cool them rapidly so as to obtain powders of very small dimensions in a dispersed state. It has equally been proposed to vaporize in the same manner metals and metalloids such as lead or zinc, to burn thereafter the metallic vapor thus obtained, and to cool it suddenly in such a way as to precipitate the oxides in a very finely divided condition. This process is not always economical because it is costly to separate the metals from their minerals before subjecting them to this treatment; further, it is difficult to obtain products which are in a sufficiently fine state because of coalescence phenomena which cause agglomeration of several particles, and which phenomena are produced by reason of the very high temperatures attained during the combustion.

The process and the apparatus according to the present invention, which are based upon applicant's researches, make it possible to obtain dispersed powders of a very satisfactory quality either by vaporizing refractory minerals, or by volatilizing and burning metallic vapors.

A special embodiment of the invention consists in treating mixtures of mineral oxides and carbon in an arc furnace in such a way as to obtain a gaseous mixture composed of CO, sub-oxides and vapors of the metals or metalloids, and to burn thereafter this gas under such conditions that combustion is complete and the temperature of the combustion is sufficiently low to avoid the coalescence phenomenon, or at least, to reduce considerably its effects.

In the process according to the invention, the two phases of the treatment are successively carried out in two separate zones (chambers), as follows:

(1) Continuous reduction and volatilization of the mixture of carbon and oxidized ore in a closed electric arc furnace and in an inert atmosphere, with control of the power (intensity) of the arc in such a way as to obtain at the outlet of the furnace a gas output which is as constant as possible.

(2) The gas leaving the arc furnace enters into another zone where it is first cooled by dilution with an inert gas, or by any other means, and thereupon is burned while avoiding superheating. Thereafter, the resultant powder is collected and separated from the suspending gas by any known means, for example, by cyclones and filters.

The invention also comprises the apparatus and certain details of the equipment which makes it possible to carry out the process described above.

While the following description relates more particularly to the manufacture of dispersed silica, the invention is not limited to this material and extends to all substances which can be treated in analogous fashion in a similar apparatus.

In the case of silica, the mere vaporization of this substance makes it necessary to exceed a temperature of 2000° C., whereas, by employing a mixture of $SiO_2+C$, there is obtained the sub-oxide SiO which already vaporizes at a temperature of 1600–1700° C.

The invention will be better understood by referring to the following figures in which:

Figures 1 and 2 represent sectional elevations of the combination of furnace and hood in which the gases are cooled and then burned. More particularly, Figure 1 is a section along the line 1—1 of Figure 2, and Figure 2 is a section along the line 2—2 of Figure 1.

Figure 3 represents, in elevation, and to a larger scale, the hood serving for the cooling and combustion of the gases.

Figure 4 is a section along the lines 4—4 of Figure 3.

Figure 5 represents another embodiment of the hood.

Figure 6 illustrates the power regulating scheme.

Figure 7 illustrates how the inlet of the inert gas into the furnace is controlled by the power regulating device.

Figure 8 represents a plan view of the installation assembly wherein the two cyclones, serving for collection of the dispersed powder, are connected in series.

Figure 9 illustrates the disposition of the filtering bags on the second cyclone.

In these figures, corresponding parts are designated by the same reference numerals.

In Figures 1 and 2, the casing 1 of the furnace, as well as the electrode supports and the feed system, are all airtight. The vapor leaves by the opening 2. The crucible 3 is formed of fine, pure $SiO_2$ sand and is surrounded by a wall of silicon carbide (SiC) bricks which supports the arched roof formed of graphite plates 5. In practice, this arrangement leads to a crucible which is self-lining. The distance between the arc and the SiC bricks is such that the temperature of the SiC bricks is less than the decomposition temperature of SiC. A thin layer of SiC forms on the interior surface of the roof, composed of graphite plates, which protects the graphite from attack by the vapor.

The graphite electrodes 6 are given a longitudinal translational movement by means of suitable screw devices (not illustrated).

A protecting graphite sleeve 7 prevents contact between the electrodes and the coke granules 8 forming the heat insulating lining of the upper part of the furnace.

Feed of the charge is accomplished by means of two endless screws 11, each supplied from a hopper 12. The endless screws inject the mixture of silica sand and coke by a pipe 13 which is surrounded by a graphite tube 14. The mixture should be introduced close to the active zone of the arc, but outside the arc, in order to avoid projections of quartz splinters by dynamic effects. The small splinters entrained by the gaseous mixture would be found in the final product and have sharp, cutting angles which are very harmful in the case where the silica is used as a filler for rubber, because they decrease considerably the tear resistance.

The furnace is maintained under a nitrogen atmosphere to prevent vapor from ascending into the electrode supports and supply pipes. Supply of nitrogen into the furnace takes place through tubes 15 at the electrodes, and tubes 16 at the feed pipes.

Sight-holes 17 at the end of supply pipes enable control of the feed.

The gaseous mixture produced in the furnace leaves by a graphite tube 9 and enters into a second chamber or zone formed of a sheet metal hood 10. The inert gas serving to dilute and cool the gaseous mixture before its combustion, is introduced into the hood through pipe 27 and circular distributor 28. Extended openings 29 for the inlet of air or oxygen are disposed at a certain distance above the distributor 28.

Figure 3 shows the same arrangement to a larger scale. From Figure 4 it will be seen that behind the openings 29 inside the hood 10, there are disposed pivoted louvre devices 30, provided with means (not shown) for adjusting their angular position.

The reduction of silica by the coke can also be carried out in a resistance furnace of the type which makes it possible to obtain a regular vapor output; however, the material used as a resistor gives off vapors which mix with the $SiO+CO$ and contaminate the resultant silica. On the other hand, an arc furnace makes it possible to obtain a much greater concentration of power and, as a result, a more compact installation which is, therefore, less costly for a given output. Accordingly, the arc furnace is much to be preferred in the industrial application of the process of the present invention.

In order to obtain good operating conditions in the first phase—continuous reduction and volatilization—of the invention, it is indispensable to obtain relative stability of the furnace power, that is to say, of arc intensity. This result is obtained:

(1) By controlling the continuous feed of silica and coke in such a way that the level of the liquid bath remains 10 to 20 mm. below the electrodes;

(2) By making up for the consumption of the electrodes in such a way as to maintain the distance between the tips 80 to 150 mm.;

(3) By controlling the nitrogen supply as a function of arc intensity.

In fact, when the density of the vapor surrounding the electrodes increases greatly, the impedance of the medium where the arc is struck is considerably decreased and, as a result, there takes place a considerable increase in the amperes absorbed by the furnace. By increasing the nitrogen supply, the vapors are eliminated much more quickly from the furnace and, as a result, the density inside of the furnace is decreased and, by an inverse phenomenon, the intensity of the arc is reduced. Conversely, deficiency of nitrogen causes an increase in intensity.

It will be seen, therefore, that by providing an apparatus which regulates automatically the nitrogen supply as a function of arc intensity, it is possible to obtain good stability of the latter. Such a regulating scheme is diagrammatically illustrated in Figures 6 and 7, and is based upon applicant's concept of making use of the voltage drop across the choke coil 18 of the furnace which is proportional to the intensity of the arc. Following amplifications of this voltage drop by the transformer 19, it is fed to the coil 20 of the electromagnet whose movable core 21 (Fig. 7) actuates a piston 22, which slides in a tube 23 and closes a lateral calibrated opening 24 in a main 24', and which controls the nitrogen supply—admitted through the pipe 25—to both tubes 15 and 16 (Figures 1 and 2).

When the intensity of the arc increases, the drop acros the (self-induction) coil 18 increases likewise. The voltage applied to the electromagnet being proportionally greater, its current and the resultant flux are also increased. The movable core 21 is attracted upwards; a suitable anchored spring 26 controls its movement. In ascending, the core takes along piston 22, thus uncovering still more the opening 24. In this manner, the nitrogen supply is increased. Conversely, a decrease in the intensity of the arc produces, by a reduction in the voltage drop, descent of the plunger 21 of the electromagnet 20 and, through the intermediary of the piston 22, partly closes the opening 24 and, consequently, decreases the nitrogen supply to tubes 15 and 16.

By the use of these arrangements, it is possible to obtain at the upper opening of the graphite tube 9 (Figure 1) a regular output of the mixture $CO+SiO+Si$ entering into the hood 10 where the second phase of the process is carried out. First of all, it is necessary to dilute the gaseous mixture and to cool it in order to prevent its subsequent combustion from raising it to a temperature sufficiently high to produce coalescence phenomena; the latter are harmful because they increase the size of the resultant silica. The inert gas used for cooling and dilution is introduced through tube 27 and distributor 28, either immediately at the outlet of the mixture $CO+SiO+Si$ in the hood 10, or else, slightly above the latter. As diluents, there can be used either cold nitrogen or a portion of the combustion gases which are recycled following separation of the dispersed silica and suitable cooling, or any other inert gas can be employed.

In order to cool the gaseous mixture more intensely, the walls of the hood can be cooled with trickling water.

Above the dilution and cooling zone, there is admitted a combustion supporting gas such as air, oxygen or a mixture of the two, in sufficient quantity to burn the $SiO+Si$ mixture completely so as to obtain a perfectly white dispersed silica. The inclination of the louvres 30 (Figure 4) are adjusted in such a way as to produce turbulent motion which increases to a maximum the volume of the flame and, as a result, reduces its temperature.

Figure 5 shows another embodiment of the hood 10 in which the distributor for the diluent gas is disposed outside the hood, and the inlet of the combustion-supporting gas can be regulated by displacing a movable element 31. In this manner, it is possible to obtain a much more intense cooling of the flame during the combustion of the mixture $CO+SiO+Si$.

If cooling by means of an inert gas at the inlet to the hood 10 be eliminated then, then, it is still possible to obtain a dispersed white silicia; however, it is not as fine and its weight per litre is greater.

The silica which is precipitated in solid state in a highly dispersed condition, in suspension in the combustion gases, leaves the upper part of the hood 10 by the pipe 32.

Figure 8 shows the entire installation in plan view, the furnace being represented at 1 with its electrodes 6 and its hood 10. The fan 33 exhausts the combustion gases containing suspended therein the dispersed silica, and forces the mixture into the first cyclone 34, where a portion of the silica is precipitated down.

From the outlet of cyclone 34, the gas passes into cyclone 35 where the remainder of the silica, almost all of it, is precipitated down. The gases $(N+CO_2+excess\ O)$ are then filtered through the filtering bags 36, the disposition of which is shown in Figure 9, which illustrates the upper part of the cyclone 35 in elevation. When recycled gases are used for dilution and cooling, the gases are taken off immediately prior to their entrance into the filtering bags 36.

The silica obtained by the process of the invention is a very finely divided product and includes particles running in size from 10 to 100 millimicrons; when viewed under an electron microscope, they appear as tiny spheres. X-ray examination shows that this silica is amorphous. By reason of this fact and the spherical shape of the particles, this product is especially adapted for use as a filler for plastic materials and rubber, whereas the known methods of manufacture yield a dispersed silica which contains quartz splinters of polygonal shape harmful to rubber. This inconvenience is completely avoided by the use of the method of the present invention.

Moreover, it is unnecessary to incorporate in the silica, produced by the method described above, more sulfur or accelerator than is used with normal fillers for rubber; this is so because, in contrast with the silicas prepared by other processes, the silicas prepared in accordance with this invention are not characterized by high absorption.

*Examples*

*Example I.*—A mixture of 5 parts of pure silica sand and one part of pulverized coke is progressively and regularly charged at the rate of 16 kg./hour, into a monophase furnace supplied with alternating current of 50 cycles, 110 volts (Figure 1).

The regulating scheme (Figures 6 and 7) maintains the amperage at about 1500 amp. in the furnace itself where the reduction and volatilization take place. When the vapors of SiO+Si+CO arrive at the bottom of the hood 10, they are cooled by a supply of 5 cubic meters of a cooling gas (N or recycled gases) per kg. of vaporized silica. A supply of 120 cubic meters per kg. of vaporized silica is introduced into the upper part of the hood through the slots 29 and insures the complete combustion of SiO+Si+CO without superheat.

There is obtained by this operation a perfectly white dispersed silica which does not contain any particles of splintered quartz of polygonal shape and which is very fine, the weight per litre of non-compressed product being merely 40 to 50 grammes. Even after powerful compression, the weight per litre does not exceed 150 grammes. 60% of the product is of a size smaller than 130 millimicrons.

The energy consumption in the foregoing operation amounts to 7-8 kw. hours per kg. output of dispersed silica.

*Example II.*—The operation is carried out in a similar fashion and in an identical furnace, as in the case of Example I, but the supply of cooling gas is progressively diminished from 5 m.$^3$ per kilogram of vaporized silica to zero.

The resultant product is still white but is not as fine; its weight per litre increasing from 50 to 120 gms., the last figure corresponding to the product obtained when the cooling gases are eliminated.

The process and apparatus described above may be employed for producing all kinds of substances in a very fine condition, for example, alumina, titanium dioxide, magnesia, beryllia, zircon, zinc oxide, fluorspar, etc.

The furnace can also be supplied with a mixture of two or more minerals with or without coke, which makes it possible to obtain dispersed powders having the most varied properties, such as shape of grains, color, etc.

As indicated earlier in the present description, the operating temperature in the furnace in the case of treatment of silica and a carbonaceous reducing agent (coke, coal, etc.) is of the order of 1600-1700 C.; the temperature in the oxidizing-combustion-zone is generally less and does not exceed 1300° C. in order to avoid coalescence phenomena. In the case of treatment of other minerals, the treating temperature will necessarily vary with the particular material; generally, the temperature in the furnace will be that required to produce effective volatilization and reduction (where required) of the charge, and the temperature in the oxidizing-combustion-zone will be maintained—by the initial cooling of the furnace products—below the temperature at which detrimental coalescence phenomena take place.

I claim:
1. A continuous process for producing finely divided refractory oxides comprising the steps of: feeding a mixture of mineral oxide and a reducing agent into an enclosed electric arc furnace comprising electrodes; passing a current between the electrodes so as to produce an arc, heating of the mixture, and at least partial reduction of said mineral oxide to produce gaseous reduction products; supplying an inert gas to the furnace to continuously sweep the reduction products therefrom and into a separate oxidizing zone; automatically varying the volume of the inert sweep gas supplied to the furnace with variation in the intensity of the arc current, whereby the intensity of the current is maintained substantially constant; cooling said reduction products upon their entrance into said zone; contacting the cooled reduction products in said zone with a gaseous oxidizing medium to oxidize said reduction products and to thereby produce the refractory oxide in a finely divided, solid state suspended in combustion gases, and separating the finely divided oxide from the combustion gases.

2. A process according to claim 1, characterized in that the oxidizing medium is injected tangentially into the cooled reduction gases so as to produce turbulent motion of the reactants in the oxidizing zone.

3. A process according to claim 1, further characterized in that the heating of the mixture produces a molten layer in the furnace and that the rate of feed of the mixture is adjusted to maintain the level of the layer below the tips of the electrodes.

4. Process according to claim 1, characterized in that the mixture is fed into the furnace in proximity of the active zone of the electric arc, but outside of said active zone.

5. Process according to claim 1, characterized by the use of a carbonaceous reducing agent.

6. A process according to claim 1, characterized in that the combustion gases from which the finely divided oxide has been separated, are cooled and thereupon, are recycled to the oxidizing zone to serve for the cooling of the reduction products.

7. A process according to claim 1, wherein a mixture of silica sand and a carbonaceous reducing agent is fed into the furnace, and finely divided silica is separated from the combustion gases.

8. A system for producing finely divided refractory oxides comprising, in combination: an enclosed arc furnace and displaceable electrodes therefor; electric supply lines for said electrodes; means for feeding raw materials to said furnace; means for supplying an inert gas to said furnace; an impedance in the electric supply lines to the electrodes; electromagnetic means connected across said impedance and energized by the voltage drop across said impedance; means actuated by said electromagnetic means for controlling the supply of inert gas to the furnace in dependence on the current passing through the electrodes; an outlet for effluent gaseous products from said furnace connected to a separate cooling and oxidizing zone; means in said zone disposed in immediate proximity to said outlet for cooling the effluent gaseous products; inlet means in said zone for oxygen-containing gases, said inlet means being disposed above said cooling means; an outlet for the combustion gases from said oxidizing zone, and separating means for the finely divided solids associated with said outlet.

9. A system according to claim 8, wherein the gas inlet means to the oxidizing zone is adjustable and adapted to produce a tangential flow of the gas into the zone and turbulence of the gases inside said zone.

10. A system according to claim 8, wherein the roof of the furnace, the feeding means for the raw materials, and the outlet for the reduction products from the furnace are all lined with graphite.

11. A process for producing a finely divided metallic oxide comprising the steps of: feeding a comminuted metal into an enclosed electric arc furnace comprising electrodes; passing a current between the electrodes so as to produce an arc, heating and vaporization of the metal; supplying an inert gas to the furnace to continuously sweep the metal vapor therefrom into a separate combustion zone; automatically varying the volume of the inert sweep gas supplied to the furnace with variation in the intensity of the arc current, whereby the intensity of the current is maintained substantially constant; cooling said vapor upon its entrance in said zone by contact with a cooler inert gas; contacting the cooled metal vapor in said zone with a gaseous oxidizing medium to burn the metal vapor and thereby produce an oxide of the metal in a finely divided solid state suspended in the combustion gases, and separating the finely divided metallic oxide from the combustion gases.

12. In a process for treating refractory solid materials in the presence of an inert gas in an arc furnace supplied from an electric circuit, which treatment results in the formation of vapors which are swept from the furnace by the said gas, and wherein the presence of said vapors alters the impedance of said circuit, the improvement in said process of maintaining the current in said circuit substantially constant, consisting in: sensing the voltage drop across a portion of said circuit, and utilizing said voltage drop to control the supply of the inert gas to the furnace.

References Cited in the file of this patent

UNITED STATES PATENTS

| | | |
|---|---|---|
| 1,563,853 | Harty | Dec. 1, 1925 |
| 2,238,793 | Hanawalt et al. | Apr. 15, 1941 |
| 2,428,178 | Reik | Sept. 30, 1947 |
| 2,543,708 | Rice et al. | Feb. 27, 1951 |
| 2,573,057 | Porter | Oct. 30, 1951 |
| 2,614,906 | Spialter et al. | Oct. 21, 1952 |
| 2,761,002 | Laird et al. | Aug. 28, 1956 |